(12) United States Patent
Wiegenfeld et al.

(10) Patent No.: US 9,740,915 B2
(45) Date of Patent: Aug. 22, 2017

(54) SYSTEM AND METHOD FOR LINK ANALYSIS BASED ON IMAGE PROCESSING

(71) Applicant: Verint Systems Ltd., Herzliya Pituach (IL)

(72) Inventors: Eran Wiegenfeld, Herzliya (IL); Alexander Svyatets, Petach-Tiqwa (IL); Gennady Shmidov, Netanya (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 156 days.

(21) Appl. No.: 13/663,401

(22) Filed: Oct. 29, 2012

(65) Prior Publication Data

US 2013/0148858 A1     Jun. 13, 2013

(30) Foreign Application Priority Data

Oct. 31, 2011   (IL) .......................................... 216058

(51) Int. Cl.
*G06K 9/00* (2006.01)
*H04L 29/06* (2006.01)
*H04W 4/20* (2009.01)

(52) U.S. Cl.
CPC ........ *G06K 9/00248* (2013.01); *H04L 63/306* (2013.01); *H04W 4/206* (2013.01); *G06F 2209/542* (2013.01); *G06K 9/00677* (2013.01)

(58) Field of Classification Search
CPC ... G06Q 50/01; G06F 21/32; G06F 2209/542; G06K 9/00993; G06K 9/6267; G06K 9/00523; G06K 9/00288; G06K 9/00248; G06K 9/0677; H04L 63/306; H04W 4/206

USPC .................................................. 382/105, 115
See application file for complete search history.

(56) References Cited

U.S. PATENT DOCUMENTS

| | | |
|---|---|---|
| 5,689,442 A | 11/1997 | Swanson et al. |
| 6,404,857 B1 | 6/2002 | Blair et al. |
| 6,718,023 B1 | 4/2004 | Zolotov |
| 6,757,361 B2 | 6/2004 | Blair et al. |
| 7,216,162 B2 | 5/2007 | Amit et al. |
| 7,466,816 B2 | 12/2008 | Blair |
| RE40,634 E | 2/2009 | Blair et al. |

(Continued)

FOREIGN PATENT DOCUMENTS

| | | |
|---|---|---|
| EP | 2151787 | 2/2010 |
| WO | 2007/105193 | 9/2007 |
| WO | 2009/116049 | 9/2009 |

OTHER PUBLICATIONS

Asokan et al., "Man-in-the-Middle in Tunnelled Authentication," Oct. 24, 2002, Nokia Research Center, Finland.*

(Continued)

*Primary Examiner* — Kenny Cese
(74) *Attorney, Agent, or Firm* — Meunier Carlin & Curfman

(57) ABSTRACT

Methods and systems to identify relationships between individuals by analyzing digital images and automatically detecting individuals who appear together in the images. A link analysis system accepts one or more digital images, and automatically recognizes individuals who appear together in the images. The system may recognize the individuals, for example, by applying a suitable face recognition process to the images. Upon identifying individuals who appear together, the system defines a relationship between them and acts upon the relationship.

13 Claims, 2 Drawing Sheets

(56) References Cited

U.S. PATENT DOCUMENTS

| | | | |
|---|---|---|---|
| 7,587,041 B2 | 9/2009 | Blair | |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2008/0310688 A1* | 12/2008 | Goldberg | 382/118 |
| 2009/0233623 A1* | 9/2009 | Johnson | H04W 4/02 455/456.3 |
| 2010/0142762 A1* | 6/2010 | Morita | G06F 17/30259 382/115 |
| 2010/0177938 A1* | 7/2010 | Martinez | G06K 9/00677 382/118 |
| 2010/0179874 A1* | 7/2010 | Higgins et al. | 705/14.53 |
| 2011/0046920 A1* | 2/2011 | Amis | G01S 19/16 702/181 |
| 2011/0182485 A1* | 7/2011 | Shochat | G06K 9/00221 382/118 |
| 2012/0215771 A1* | 8/2012 | Steiner | G06F 17/30528 707/723 |

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

Extended European Search Report, dated Jul. 31, 2014, received in connection with corresponding European Application No. 12190634.1.

* cited by examiner

SYSTEM AND METHOD FOR LINK ANALYSIS BASED ON IMAGE PROCESSING

FIELD OF THE DISCLOSURE

The present disclosure relates generally to data analysis, and particularly to methods and systems for identifying relationships between individuals.

BACKGROUND OF THE DISCLOSURE

Various image processing techniques for recognizing faces in images are known in the art. Face recognition is used in a variety of applications, such as in security, biometry, border control and visa processing systems. Face recognition solutions are offered, for example, by Face.com (Tel Aviv, Israel), L1 Identity Solutions, Inc. (Billerica, Mass.) and Cognitec Systems (Dresden, Germany), among others.

SUMMARY OF THE DISCLOSURE

An embodiment that is described herein provides a method including accepting one or more digital images. First and second individuals, who appear together in the images, are recognized automatically. A relationship is defined between the recognized first and second individuals, and the relationship is acted upon.

In some embodiments, accepting the digital images includes monitoring communication conducted in a communication network, and extracting the digital images from the monitored communication. Extracting the images may include reconstructing a communication session in which the images are exchanged, and extracting the images from the reconstructed session. In an embodiment, at least some of the monitored communication is encrypted with a transport-layer cryptographic protocol, and the method includes decrypting the cryptographic protocol before extracting the images.

In some embodiments, the method includes automatically recognizing a third individual who appears together with the second individual in the images, and deducing that the second individual acts as a mediator between the first and third individuals. In a disclosed embodiment, recognizing the individuals includes recognizing the first and second individuals in the same image. In another embodiment, recognizing the individuals includes recognizing the first and second individuals in a group of the images exchanged during the same communication session.

In an embodiment, recognizing the first and second individuals includes applying a face recognition process to the images. In another embodiment, recognizing the individuals includes recognizing in the images a car license plate that is associated with one of the first and second individuals.

In some embodiments, the method includes assigning a confidence score to the relationship. Assigning the confidence score may include setting the confidence score depending on a number of times the first and second individuals appear together in the images. Additionally or alternatively, assigning the confidence score may include setting the confidence score depending on a source from which the images, in which the first and second individuals appear together, are obtained.

In an embodiment, acting upon the relationship includes outputting a data structure that presents relationships among individuals, including the detected relationship. In an embodiment, defining the relationship includes presenting the detected relationship for approval by a human operator. In some embodiments, accepting the digital images includes obtaining the images from at least one image source selected from a group of sources consisting of public Internet content, surveillance cameras and seized digital equipment.

There is additionally provided, in accordance with an embodiment that is described herein, apparatus including an interface and a processor. The interface is configured to accept one or more digital images. The processor is configured to automatically recognize first and second individuals who appear together in the images, and to define a relationship between the recognized first and second individuals.

The present disclosure will be more fully understood from the following detailed description of the embodiments thereof, taken together with the drawings in which:

DETAILED DESCRIPTION OF EMBODIMENTS

Overview

Various data analytics applications attempt to identify relationships between individuals. For example, investigation agencies are sometimes interested in constructing a map of relationships between target individuals such as criminals. Applications of this sort are sometimes referred to as "link analysis." Example link analysis techniques are described in U.S. Pat. No. 7,882,217 and U.S. patent application Ser. Nos. 12/888,445 and 12/964,891, which are assigned to the assignee of the present patent application and whose disclosure is incorporated herein by reference.

Embodiments that are described herein provide improved methods and systems for detecting such relationships. The disclosed techniques identify relationships between individuals by analyzing digital images and automatically detecting individuals who appear together in the images. The images may be obtained from various sources, for example from open source intelligence (e.g., publically available Internet content such as Web sites or social networks), from intercepted communication sessions and/or from digital evidence (e.g., seized computers or phones).

The fact that certain individuals appear together in the same image is often an indication that they are related to one another. Other kinds of joint appearance, e.g., individuals who appear in images exchanged during the same communication session (e.g., images attached to the same e-mail message) may also be indicative of a relationship.

In some embodiments, a link analysis system accepts one or more digital images, and automatically recognizes individuals who appear together in the images. The system may recognize the individuals, for example, by applying a suitable face recognition process to the images. Upon identifying individuals who appear together, the system defines a relationship between them and acts upon the relationship.

The methods and systems described herein use an entirely new medium for detecting relationships—Digital images. The disclosed techniques are highly effective in identifying relationships between individuals, including individuals who refrain from communicating with one another or take other measures to hide their relationship. In some embodiments, the disclosed techniques are used for identifying mediators, i.e., individuals who mediate between target individuals in order to avoid direct communication between them.

System Description

Figure 1:
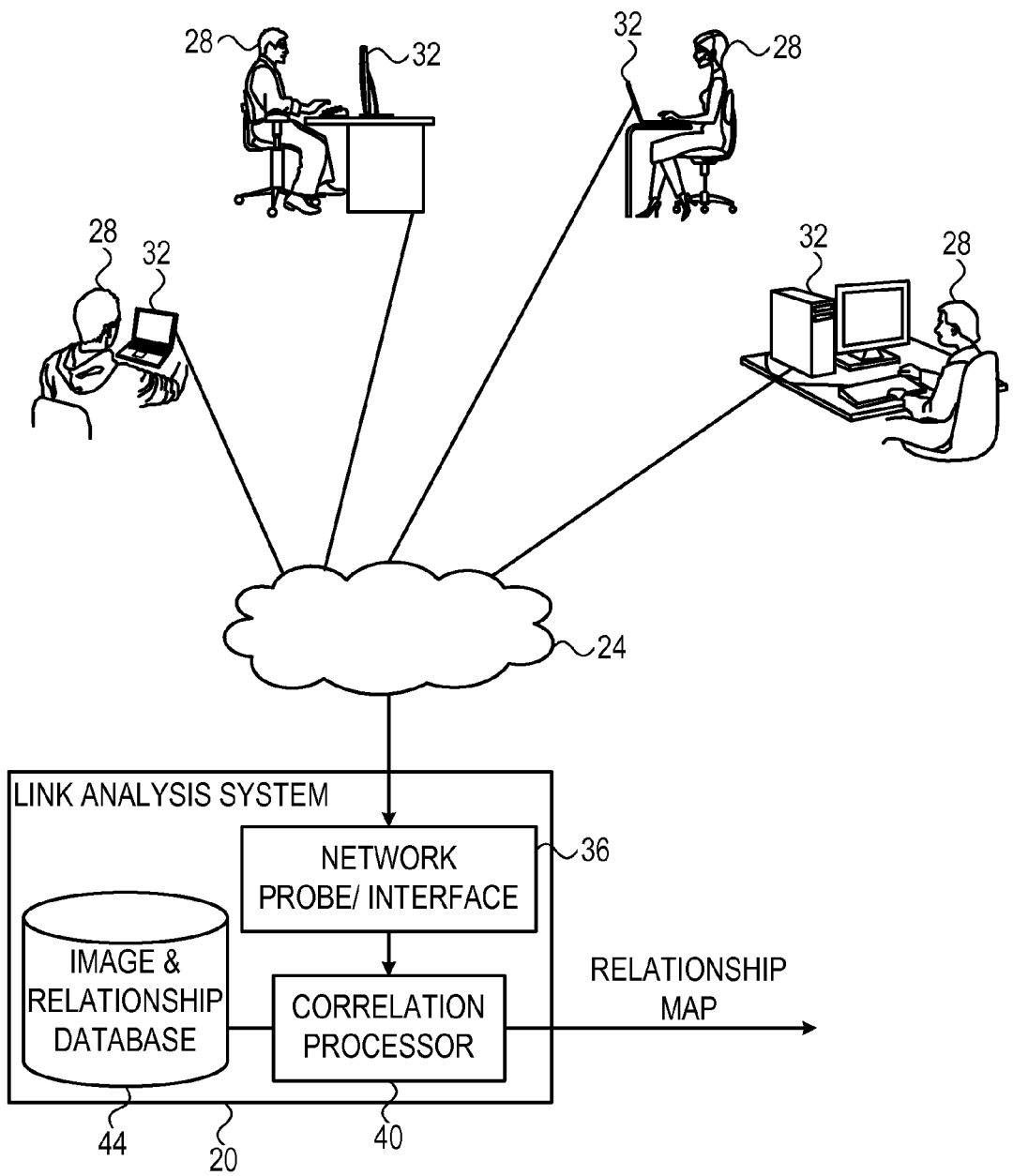
FIG. 1 is a block diagram that schematically illustrates a system for link analysis, in accordance with an embodiment of the present disclosure.

FIG. 1 is a block diagram that schematically illustrates a system 20 for link analysis, in accordance with an embodiment of the present disclosure. A system of this sort may be used, for example, by investigation agencies for identifying and tracking relationships between suspect individuals. Investigations of this sort may comprise, for example, intelligence investigations, law enforcement investigations, pedophilia investigations, internal investigations, fraud investigations or financial investigations.

The description that follows refers mainly to images that are obtained from intercepted communication. As explained above, however, the disclosed techniques can be applied to images that are obtained from various other sources.

System 20 is connected to a data communication network 24, typically an Internet Protocol (IP) network. Network 24 may comprise, for example, the Internet, an enterprise Intranet or any other public or private network. Multiple individuals 28, also referred to as users, communicate over network 24 using computers 32.

Users 28 may send and receive digital images as part of the communication they conduct over network 24. For example, a user may send or receive e-mail messages with embedded or attached images, or upload images to an image sharing Web-site or a social network page. In these scenarios, the communication traffic of the sessions will comprise the digital images.

The appearance of two or more individuals together in the images is often a strong indicator that the individuals are related to one another in some way. System 20 thus monitors communication conducted in network 24, extracts digital images from the monitored communication traffic, and attempts to detect individuals who appear together in the images.

Typically, the system identifies the individuals by applying face recognition methods to the extracted images. Upon identifying two or more individuals who appear together in the images, the system defines a relationship between them. The system may, for example, create a new relationship or increase the confidence of an existing relationship. Several example criteria for setting the confidence of a relationship are given below.

In the context of the present patent application and in the claims, the term "individuals appearing together" is used to describe various forms of joint appearance in the images. For example, individuals who appear in the same image are usually regarded as very likely to be related. A more subtle relationship may be established between individuals who appear in different images that are exchanged during the same communication session. Examples of this sort of relationship comprise images that are attached to the same e-mail message, images that are uploaded to a Web-site in the same upload session, or images that are posted on the same Web page.

In various embodiments, system 20 may extract images from various sources, such as, for example, e-mail, Webmail, Peer-to-Peer (P2P), chat, Instant messaging, Multimedia Messaging Service (MMS) messages, File transfer Protocol (FTP) applications, social networks, file sharing, image-sharing or video-sharing Web-sites, Internet forums, search engines, seized equipment and/or any other suitable source. Other possible sources for images are surveillance cameras such as border control cameras or public security cameras. In some embodiments, system 20 analyzes images that are obtained from two or more different sources.

In the example embodiment of FIG. 1, system 20 comprises a network probe or other network interface 36 for communicating with network 24. System 20 further comprises a correlation processor 40 that carries out the methods described herein. In some embodiments, system 20 comprises an image & relationship database 44. The database typically holds data regarding existing relationships, facial images of known target individuals for identification, and/or any other suitable information. In these embodiments, processor 40 typically identifies target individuals in the extracted images by comparing the extracted images to the images stored in database 44.

Processor 40 may use any suitable face recognition or other image processing method for recognizing individuals in the extracted images. In various embodiments, the processor may use face detection algorithms such as (but not limited to) Viola-Jones object detection framework, Schneiderman & Kanade and Rowley, Baluja & Kanade, and/or face recognition algorithms such as (but not limited to) Principal Component Analysis, Linear Discriminate Analysis, and Elastic Bunch Graph Matching—among others, possibly proprietary, licensed or others.

Processor 40 may take various actions upon detecting individuals who appear together in the images. Typically, processor 40 maintains in database 44 a data structure, referred to as a relationship map, which indicates the known relationships. In some embodiments, each relationship in the map may be assigned a respective confidence score. When processor 40 recognizes individuals who appear together in the images, the processor may create a new relationship (e.g., when the individuals in question are not previously known to be related) or increase the confidence score of an existing relationship (e.g., when the individuals are already defined as related). As another example, the processor may trigger an alert or take any other suitable action upon detecting a relationship.

In the present example, processor 40 reports the relationship map and/or other inputs to an investigation system (not shown in the figures) for presenting to an operator. In some embodiments, processor 40 requests the operator to review and approve the detected relationship before updating the relationship map. In an embodiment, operator approval is requested only for creating new relationships or upon identifying new potential target individuals, and not for updating existing relationships. When requesting the operator approval, processor 40 typically presents the image or images in which the individuals in question appear to the operator.

The configuration of system 20 shown in FIG. 1 is an example configuration, which is chosen purely for the sake of conceptual clarity. In alternative embodiments, any other suitable system configuration can also be used. Some elements of system 20 may be implemented in hardware, e.g., in one or more Application-Specific Integrated Circuits (ASICs) or Field-Programmable Gate Arrays (FPGAs). Additionally or alternatively, some system elements can be implemented using software, or using a combination of hardware and software elements. Database 44 may be implemented using any suitable type of memory, such as using one or more magnetic or solid state memory devices.

Typically, processor 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, processor 40 assigns a respective confidence score to each relationship, and adjusts the score over time. The score can be assigned in accordance with any suitable criterion. In an example embodiment, the score of a relationship between two individuals depends on the number of times these individuals appear together in the available images. Typically, a single joint appearance is not sufficient for establishing a relationship, for example since one of the individuals may be a bystander.

As another example, the score may depend on the source from which the images are obtained. In one embodiment, joint appearance in images obtained from seized equipment (e.g., computer of mobile phone) is assigned a relatively high score, while joint appearance in images obtained from open sources (e.g., public Web sites) is assigned a lower score.

In an example embodiment, processor 40 uses the disclosed techniques to identify mediators. A mediator is an individual who mediates between target individuals in order to enable them to refrain from meeting each other or communicating directly. In an embodiment, processor 40 may detect that individuals A and B appear together in the images, and also that individuals B and C appear together in the images. In this scenario, processor 40 may define individual B as a mediator between individuals A and C. This technique enables processor 40 to determine that individuals A and C are related (via mediator B), even though they may never appear together in the images. The example above refers to a single mediator. The disclosed techniques can also be used to identify a chain of two or more mediators connecting target individuals.

In some embodiment, processor 40 may identify an individual who appears repeatedly in the images but whose identity is not known. For example, processor 40 may identify an unknown individual who serves as a mediator between known target individuals. In some embodiments, processor 40 defines a separate entity for the unknown individual, and continues to maintain and track this entity until the identity of the individual in question can be established.

In some embodiments, some or all of the traffic monitored by system 20 is encrypted in accordance with a cryptographic transport-layer protocol, e.g., SSL or TLS. When such a protocol is identified, processor 40 decrypts the transport-layer encryption before extracting the images. In these embodiments, the monitored traffic is diverted to pass through system 20 before reaching its intended destination. After decrypting the traffic, processor 40 re-encrypts the traffic with the applicable transport-layer encryption and sends the re-encrypted traffic to its intended destination.

Processor 40 may use various techniques for decrypting and re-encrypting the transport-layer encryption. In some embodiments, the transport-layer encryption comprises a public-key encryption scheme in which one end of the link provides a security certificate to the other end. In some embodiments, processor 40 replaces the certificate with a substitute certificate, and is therefore able to decrypt the transport-layer encryption. Processes of this sort are sometimes referred to as SSL Man in The Middle (SSL MITM) and are described, for example, by Soghoian and Stamm, in "Certified Lies: Detecting and Defeating Government Interception Attacks Against SSL," April, 2010, which is incorporated herein by reference.

Example inspection techniques that use substitute certificates are offered, for example, by Blue Coat Systems (Sunnyvale, Calif.), and by Check Point Software Technologies (Tel Aviv, Israel). Example inspection solutions that are produced by Netronome Systems, Inc. (Cranberry Twp., Pa.) are described in "Examining SSL-Encrypted Communications Netronome SSL Inspector™ Solution Overview," February, 2010, which is incorporated herein by reference. SSL inspection products are also offered by Packet Forensics, Inc. (Tempe, Ariz.). Processor 40 may use any of these techniques, or any other suitable technique.

Link Analysis Method Description

Figure 2:
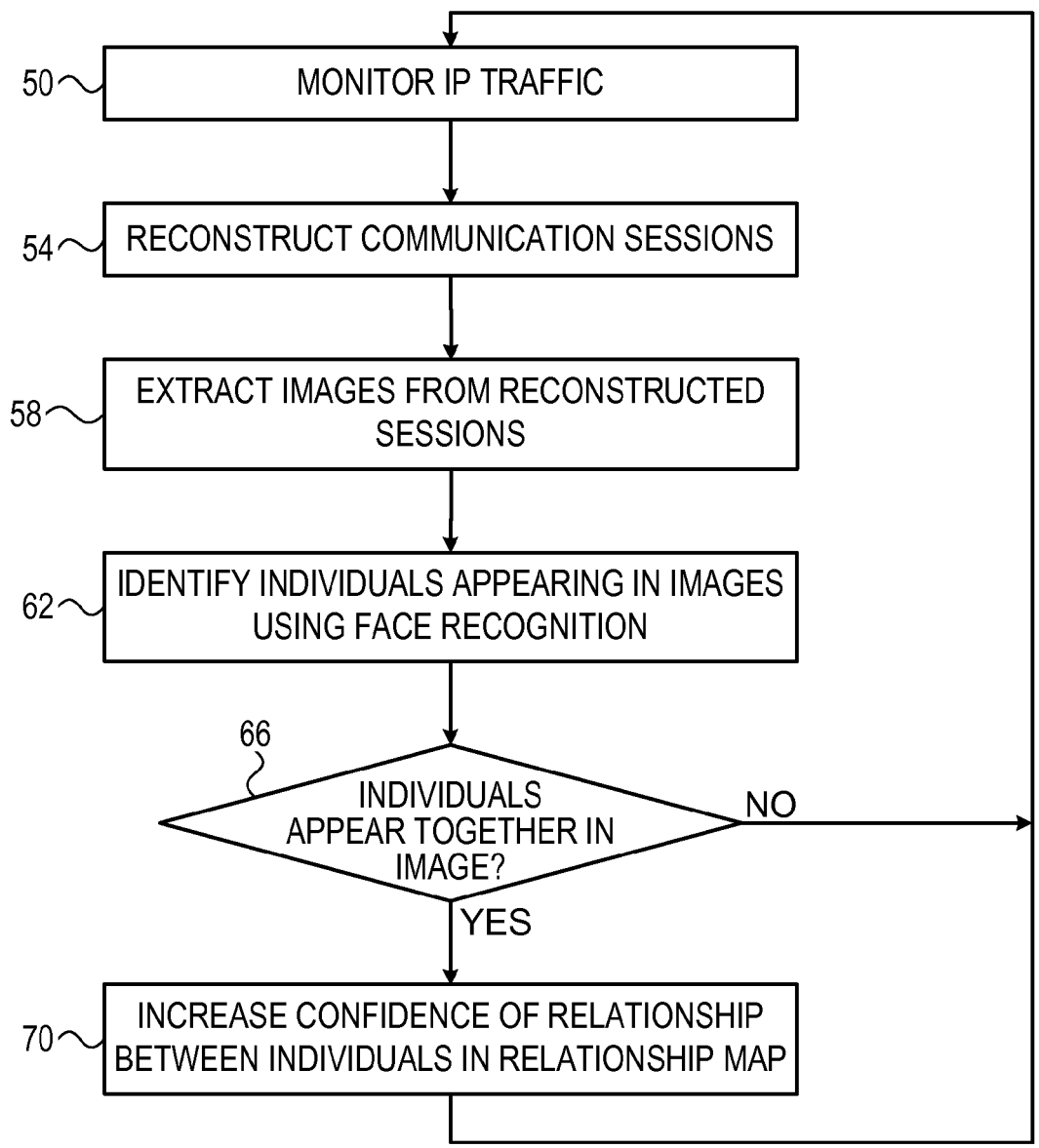
FIG. 2 is a flow chart that schematically illustrates a method for link analysis, in accordance with an embodiment of the present disclosure.

FIG. 2 is a flow chart that schematically illustrates a method for link analysis, in accordance with an embodiment of the present disclosure. The method begins with interface 36 monitoring communication traffic in network 24, at a monitoring step 50. In the present example, the traffic comprises IP traffic.

Correlation processor 40 processes the monitored IP traffic in order to reconstruct communication sessions, at a session reconstruction step 54. Having reconstructed the communication sessions, processor 40 extracts digital images from the sessions, at an extraction step 58. Processor 40 may identify and extract various types of digital images, such as bitmap images, JPEG images, TIFF images or any other suitable image type. Additionally or alternatively to still images, processor 40 may identify and extract video images of any suitable format, such as MPEG.

Processor 40 automatically recognizes individuals in the extracted images, at a recognition step 62, for example by applying a suitable face recognition process to the images. In an embodiment, processor 40 compares the extracted images to example facial images of target individuals stored in database 44. Processor 40 attempts to find individuals who appear together in the images, at a checking step 66. If no such joint appearances are found, the method loops back to step 50 above and system 20 continues to monitor the traffic of network 24.

If processor 40 succeeds in recognizing individuals who appear together in the images, the processor increases the confidence score of the relationship between them (or creates a new relationship if necessary), at a relationship updating step 70. The method then loops back to step 50 above. Using this process, processor 40 continuously maintains the relationship and updates it with newly found relationships.

Although the embodiments described herein refer mainly to investigation applications, the disclosed link analysis techniques can be used for various other applications, such as for data mining in social networks or other commercial applications.

In some embodiments, processor 40 applies the disclosed image-based techniques together with other link analysis techniques, such as with techniques based on network communication identifiers. Example identifier-based link analysis techniques are described in U.S. Pat. No. 7,882,217 and U.S. patent application Ser. Nos. 12/888,445 and 12/964,891, cited above. In these embodiments, processor 40 typically maintains a relationship map based on both image-based and identifier-based relationship detection.

Although the embodiments described herein mainly address face recognition, the disclosed techniques may also be implemented using any other suitable image processing method that is able to identify specific entities in digital images. Such a method may identify, for example, features such as clothing items (e.g., a certain logo) or tattoos that are characteristic of the target individuals.

As another example of recognizing target individuals using image processing, processor 40 may identify the license plate number of a car that appears in the images. Consider, for example, a scenario in which processor 40 recognizes a certain car license plate and also recognizes the face of a target individual located in or near the car. This recognition can be used for associating the car with the target individual. As another example, if the license plate is known to belong to a certain target but the individual appearing in or near the car is a different individual, this recognition can be used to associate the individual in the image with the known target individual.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    monitoring, by an interface coupled to a processor, communication conducted in a communication network;
    extracting, by the interface, a plurality of digital images from a monitored communication session;
    automatically recognizing, by the processor, first and second individuals who appear in first and second ones of the extracted digital images;
    defining, by the processor, a relationship between the recognized first and second individuals; and
    maintaining, by the processor, a relationship map as a data structure in a database, wherein the relationship map includes the defined relationship between the recognized first and second individuals;
    wherein monitoring communication conducted in a communication network includes:
    intercepting communication traffic conducted in the communication network such that communication traffic is diverted to pass through the interface before reaching the communication traffic's intended destination;
    detecting whether the communication traffic is encrypted in accordance with a cryptographic transport-layer protocol,
    upon detecting that the communication traffic is encrypted in accordance with a cryptographic transport-layer protocol, decrypting the transport-layer encryption before extracting the plurality of digital images; and after decrypting the communication traffic, re-encrypting the communication traffic with the transport-layer encryption and sending the re-encrypted traffic to the intended destination; and
    comprising assigning a confidence score to the relationship,
    wherein assigning the confidence score comprises setting the confidence score depending on a source from which the first images are obtained, wherein the confidence score is set higher for images that are obtained from seized equipment as compared to images that are obtained from public websites.

2. The method of claim 1, wherein extracting the plurality of digital images from a monitored communication session comprises extracting a plurality of digital images attached to a same email message.

3. The method according to claim 1, wherein extracting the images comprises reconstructing a communication session in which the images are exchanged, and extracting the images from the reconstructed session.

4. The method of claim 1, wherein extracting the plurality of digital images from a monitored communication session comprises extracting a plurality of digital images uploaded to a web-site in a same upload session.

5. The method according to claim 1, wherein recognizing the first and second individuals comprises recognizing in the images a car license plate that is associated with one of the first and second individuals.

6. The method according to claim 1, wherein assigning the confidence score comprises setting the confidence score depending on a number of times the first and second individuals appear in the images in a same monitored communication session.

7. Apparatus, comprising:
    an interface that monitors communication conducted in a communication network and extracts a plurality of digital images from a monitored communication session; and
    a processor that:
    automatically recognizes first and second individuals who appear in first and second ones of the extracted digital images;
    defines a relationship between the recognized first and second individuals; and
    maintains a relationship map which includes the defined relationship between the recognized first and second individuals;
    wherein the interface performs the monitoring by at least:
    intercepting communication traffic conducted in the communication network such that communication traffic is diverted to pass through the apparatus before reaching the communication traffic's intended destination,
    detecting whether the communication traffic is encrypted in accordance with a cryptographic transport-layer protocol;
    upon detecting that the communication traffic is encrypted in accordance with a cryptographic transport-layer protocol, decrypting the transport-layer encryption before extracting the plurality of digital images; and
    after decrypting the communication traffic, re-encrypting the communication traffic with the transport-layer encryption and sending the re-encrypted traffic to the intended destination;
    wherein the processor is configured to assign a confidence score to the relationship,
    wherein the processor is configured to set the confidence score depending on a source from which the images are obtained, wherein the confidence score is set higher for images that are obtained from seized equipment as compared to images that are obtained from public websites.

8. The apparatus according to claim 7, wherein extracting the plurality of digital images from a monitored communication session comprises extracting a plurality of digital images attached to a same email message.

9. The apparatus according to claim 7, wherein the processor is configured to reconstruct a communication session in which the images are exchanged, and to extract the images from the reconstructed session.

10. The apparatus according to claim 7, wherein the processor is configured to recognize the first and second individuals by recognizing in the images a car license plate that is associated with one of the first and second individuals.

11. The apparatus according to claim 7, wherein the processor is configured to set the confidence score depending on a number of times the first and second individuals appear in the images in a same communication session.

12. The apparatus according to claim 7, wherein the interface is configured to accept the digital images from at least two image sources selected from a group of sources consisting of public Internet content, surveillance cameras and seized digital equipment.

13. The apparatus according to claim 7, wherein extracting the plurality of digital images from a monitored communication session comprises extracting a plurality of digital images uploaded to a web-site in a same upload session.

* * * * *

UNITED STATES PATENT AND TRADEMARK OFFICE
CERTIFICATE OF CORRECTION

PATENT NO.         : 9,740,915 B2
APPLICATION NO.    : 13/663401
DATED              : August 22, 2017
INVENTOR(S)        : Eran Wiegenfeld et al.

Page 1 of 1

It is certified that error appears in the above-identified patent and that said Letters Patent is hereby corrected as shown below:

Claim 1, Column 8, Line 3 should be amended to read the following:
"the images are obtained, wherein the confidence"

Signed and Sealed this
Twenty-first Day of August, 2018

Andrei Iancu
*Director of the United States Patent and Trademark Office*